US012502901B2

(12) United States Patent
Yazawa

(10) Patent No.: US 12,502,901 B2
(45) Date of Patent: Dec. 23, 2025

(54) ELECTRONIC DEVICE

(71) Applicant: STEERETAIL CO., LTD., Kawasaki (JP)

(72) Inventor: Tatsuyuki Yazawa, Kanagawa (JP)

(73) Assignee: Steeretail Co., Ltd., Kawasaki (JP)

( * ) Notice: Subject to any disclaimer, the term of this patent is extended or adjusted under 35 U.S.C. 154(b) by 143 days.

(21) Appl. No.: 18/039,203

(22) PCT Filed: Sep. 8, 2021

(86) PCT No.: PCT/JP2021/032959
§ 371 (c)(1),
(2) Date: May 26, 2023

(87) PCT Pub. No.: WO2022/118514
PCT Pub. Date: Jun. 9, 2022

(65) Prior Publication Data
US 2023/0415505 A1 Dec. 28, 2023

(30) Foreign Application Priority Data
Dec. 2, 2020 (JP) ................................ 2020-200167

(51) Int. Cl.
*B41J 29/13* (2006.01)

(52) U.S. Cl.
CPC .................................... *B41J 29/13* (2013.01)

(58) Field of Classification Search
CPC ... B41J 29/13; B41J 2/32; B41J 15/04; G03G 21/16; H05K 5/03
See application file for complete search history.

(56) References Cited

U.S. PATENT DOCUMENTS

2018/0170064 A1* 6/2018 Higuchi ..................... B41J 2/01

FOREIGN PATENT DOCUMENTS

| | | | | |
|---|---|---|---|---|
| CN | 107569198 | A | * | 1/2018 |
| JP | H06-9180 | U | | 2/1994 |
| JP | H07-302985 | A | | 11/1995 |
| JP | H08-186911 | A | | 7/1996 |
| JP | H09-229049 | A | | 9/1997 |
| JP | 2003-318564 | A | | 11/2003 |
| JP | 2010048263 | A | * | 3/2010 |
| JP | 2011-022500 | A | | 2/2011 |

OTHER PUBLICATIONS

International Search Report for PCT Application No. PCT/JP2021/032959, mailed on Nov. 22, 2021.

* cited by examiner

*Primary Examiner* — Shelby L Fidler
*Assistant Examiner* — Tracey M Mcmillion
(74) *Attorney, Agent, or Firm* — Tutunjian & Bitetto, P.C.

(57) ABSTRACT

The present invention includes a housing unit (11), a hinge unit (13), and a lid body (12) configured to be provided on the housing unit (11) in an openable and closable manner via the hinge unit (13), wherein the hinge unit (13) includes: a shaft unit (21) configured to serve as a rotating shaft when the lid body (12) is opened/closed with respect to the housing unit (11); a bearing unit (22) configured to have a U-shaped opening to which the shaft unit (21) is fitted in a detachable manner; and a reinforcing unit (14) configured to abut, when external force that causes deformation in a widening direction of the U-shaped opening of the bearing unit (22) is applied to the bearing unit (22), against the bearing unit (22) to which the external force is applied. Thereby deformation of the bearing unit is prevented.

5 Claims, 4 Drawing Sheets

ELECTRONIC DEVICE

This application is a National Stage Entry of PCT/JP2021/032959 filed on Sep. 8, 2021, which claims priority from Japanese Patent Application 2020-200167 filed on Dec. 2, 2020, the contents of all of which are incorporated herein by reference, in their entirety.

TECHNICAL FIELD

The present invention relates to an electronic device including a housing in which constituent articles are disposed and a lid body which is opened/closed when disposing the constituent articles in the housing.

BACKGROUND ART

In recent years, printers that print information have been used in order to output electronically input information. For example, in an order entry system for the food service industry, a kitchen printer that outputs order data input from and transmitted by a handy terminal at a remote location is being used.

Such a kitchen printer is provided with a housing and a lid that is set after an article is housed in the housing.

Patent Literature 1 describes an electronic device in which a lid body is provided on a housing in an openable and closable manner via a hinge.

CITATION LIST

Patent Literature

[Patent Literature 1] Japanese Unexamined Patent Application Publication No. 2003-318564

SUMMARY OF INVENTION

As illustrated in FIG. 3, for example, a kitchen printer is provided with a lid body being a printer cover on a front surface of a housing, wherein the printer cover is opened/closed by placing a hand on the printer cover when replacing a roll paper in the housing or the like. Herein, a rotation center shaft (hereinafter, referred to as a shaft unit) when the lid body is opened/closed is disposed in a lower section. As illustrated in FIG. 4, a bearing unit supporting the shaft unit has a shape in which the upper portion thereof is opened.

Herein, in some cases, the bearing unit is deformed due to external force such as a large load when the lid is being opened or an excessive impact applied due to an object falling on the printer cover in an opened state. In view of the above-described problem, the purpose of the present disclosure is to provide an electronic device that prevents deformation of a bearing unit due to an influence of external force.

The electronic device according to the present example embodiment includes a housing unit, a hinge unit, and a lid body configured to be provided on the housing unit in an openable and closable manner via the hinge unit, wherein the hinge unit includes: a shaft unit configured to serve as a rotating shaft when the lid body is opened/closed with respect to the housing unit; a bearing unit configured to have a U-shaped opening to which the shaft unit is fitted in a detachable manner; and a reinforcing unit configured to abut, when external force that causes deformation in a widening direction of the U-shaped opening of the bearing unit is applied to the bearing unit, against the bearing unit to which moving force is applied by the external force.

Thereby, deformation of the bearing unit can be prevented.

EXAMPLE EMBODIMENT

Figure 1:
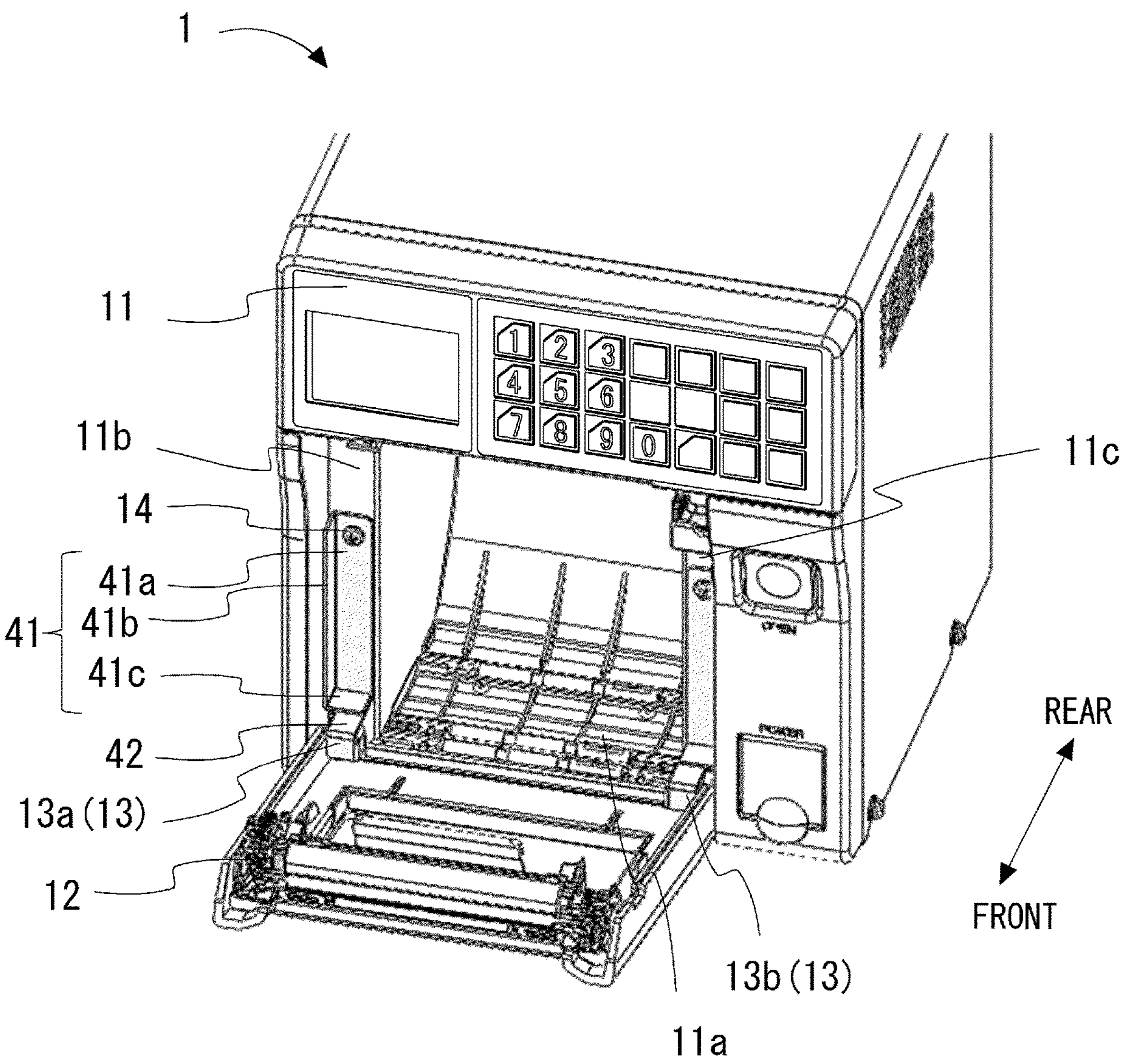
FIG. 1 is a schematic diagram of a kitchen printer.

Hereinafter, an example embodiment of the present invention will be described with reference to the drawings. As illustrated in FIG. 1, an electronic device 1 includes a housing unit 11 into which an article is able to be inserted from a front surface thereof, a lid body 12 configured to be capable of closing an opening in the front surface of the housing unit 11, a hinge unit 13 configured to connect the housing unit 11 and the lid body 12, and a reinforcing unit 14 configured to reinforce the hinge unit 13. Herein, the electronic device 1 is described as being a kitchen printer, but may be another article.

The housing unit 11 is a main body portion of a kitchen printer 1. A replaceable roll paper is disposed inside the housing unit 11. The roll paper can be replaced by bringing the lid body 12, which is provided in an opening 11*a* on the front surface of the housing unit 11, to a state of being opened (hereinafter referred to as an opened state).

Note that, on the left and right sides of the front surface-side of the opening 11*a*, edges 11*b* and 11*c* having surfaces on the forward-side and the inside of the housing unit 11 are formed.

The lid body 12 performs an opening/closing operation with a shaft unit 21 (described later) provided in the hinge unit 13 as a rotation center. As a result, the lid body 12 is able to bring the opening 11*a* on the front surface of the housing unit 11 to the opened state and bring the opening 11*a* to a state of being closed (hereinafter referred to as a closed state).

Herein, it is assumed that the hinge unit 13 is disposed in the vicinity of the lower end of the front surface of the housing unit 11. The lid body 12, in an initial state wherein the opening 11*a* of the housing unit 11 is in the closed state, is able to bring the opening 11*a* to the opened state, upon receiving force applied in such a way that the front-side upper section thereof is pulled out in the forward direction and by operating with the shaft unit 21 provided in the hinge unit 13 as a rotation center.

Note that, shifting from the opened state to the closed state of the opening 11*a* with use of the lid body 12 can be performed by applying force to the lid body 12 in a direction opposite to that in the case of shifting from the closed state to the opened state.

Figure 2:
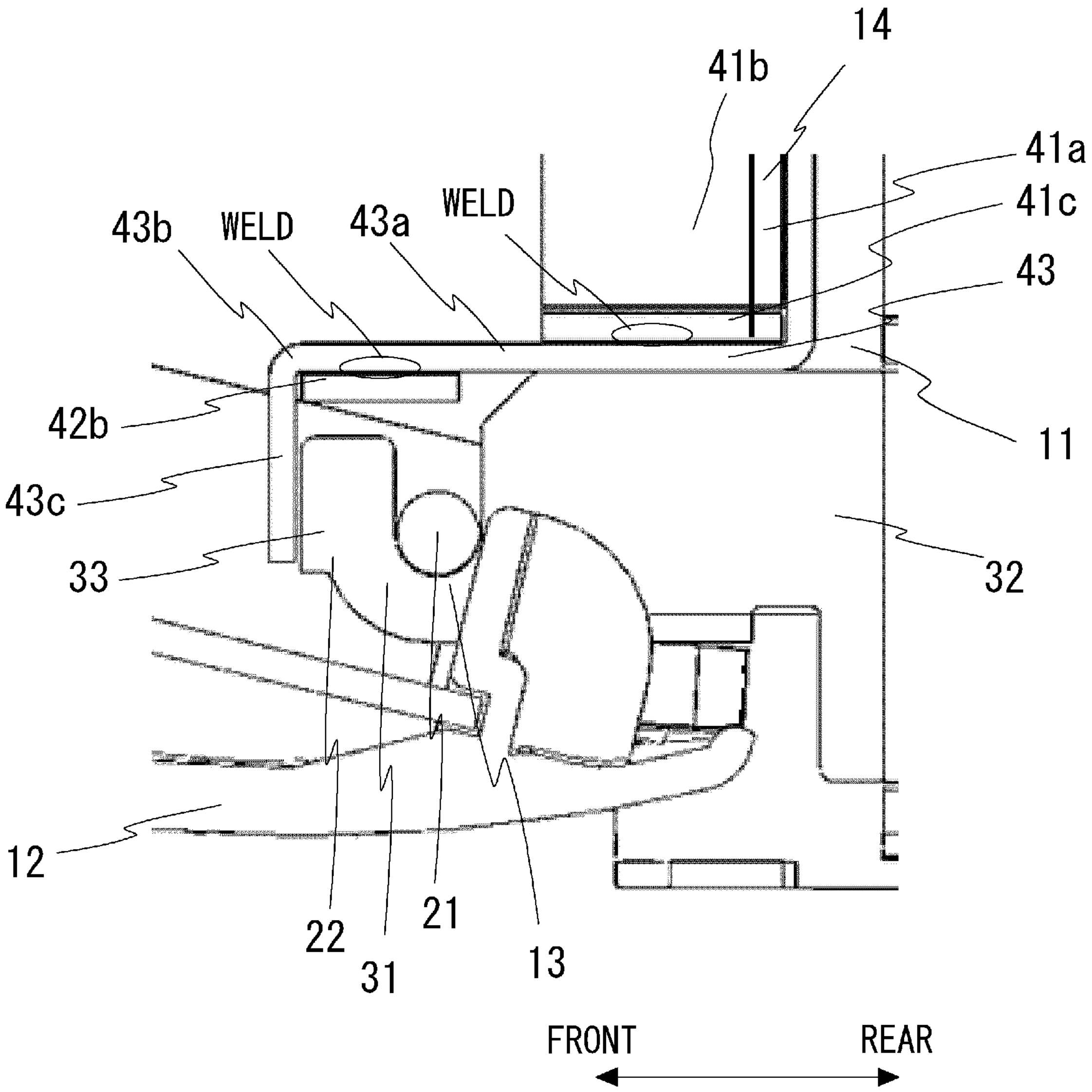
FIG. 2 is an enlarged view of the vicinity of a hinge unit of the kitchen printer.
Figure 3:
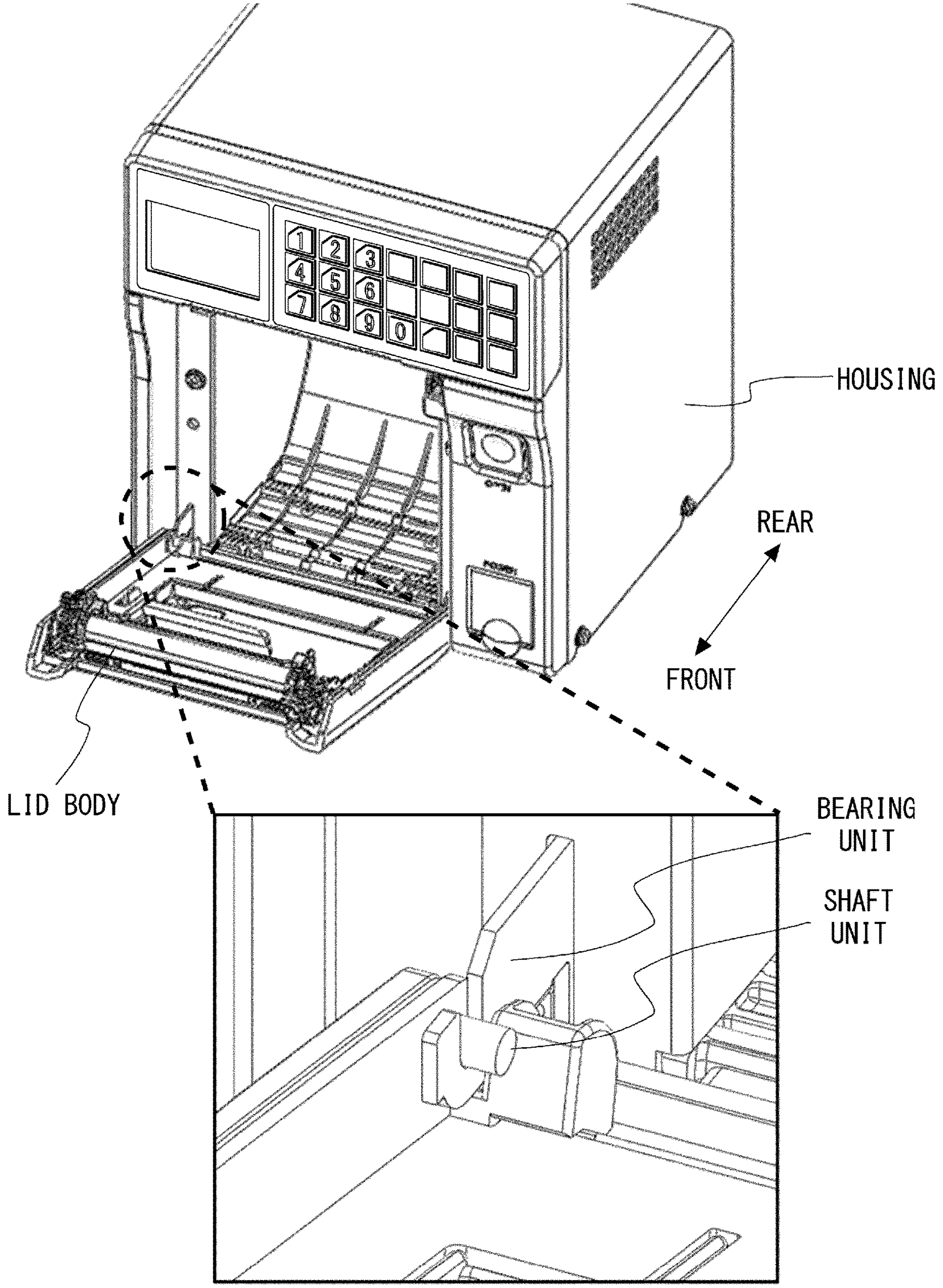
FIG. 3 is a schematic diagram of a related kitchen printer and an enlarged view of the vicinity of a bearing unit.
Figure 4:
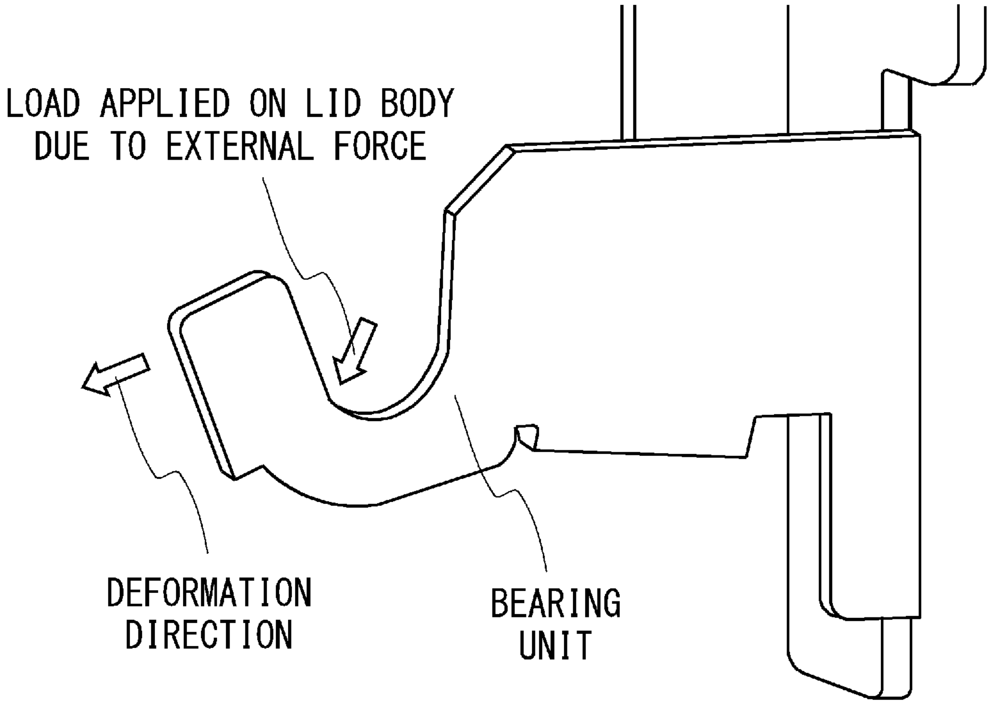
FIG. 4 is a diagram illustrating force applied to a related bearing unit.

Herein, as illustrated in FIG. 2, the hinge unit 13 includes the shaft unit 21 and a bearing unit 22. Note that, for example, the electronic device 1 is provided with two hinge units 13 connected to the housing unit 11.

That is, a first hinge unit 13*a* is disposed in the vicinity of the edge 11*b* on the left-side of the opening 11*a* of the housing unit 11, and a second hinge unit 13*b* is disposed in the vicinity of the edge 11*c* on the right-side of the opening 11*a* of the housing unit 11. Hereinafter, the first hinge unit

13*a* will be described as the hinge unit 13, but the same applies to the second hinge unit 13*b*.

The shaft unit 21 has a columnar shape with the left-right direction as an axial direction. The shaft unit 21 serves as a rotating shaft when the lid body 12 is opened/closed with respect to the housing unit 11. Note that the shaft unit 21 is connected to the vicinity of the lower section of the lid body 12 in a state where the opening 11*a* is in the closed state.

The bearing unit 22 is a U-shaped bearing having an upper side being open. The bearing unit 22 and the shaft unit 21 are detachably fitted to each other.

Herein, typically, the bearing unit 22 is a bearing metal plate formed through processing of providing a U-shaped opening in a metal plate.

Further, in the bearing unit 22, a U-shaped part which is detachably fitted to the shaft unit 21 is a bearing main body portion 31, and a first bearing end portion 32 and a second bearing end portion 33 are formed so as to sandwich the bearing main body portion 31.

The first bearing end portion 32 is an end portion disposed on the housing unit 11-side, that is, the rear side, in the bearing unit 22, and is connected to the edge 11*b* of the housing unit 11. Further, for example, the first bearing end portion 32 is connected in the vicinity of the lower section of the edge 11*b*.

Note that, the edge 11*b* may have a hole portion that allows the bearing unit 22, which is a bearing metal plate, to pass through. That is, the first bearing end portion 32 may be fixed to the edge 11*b* of the housing unit 11 in a state of penetrating the hole portion. Note that, the first bearing end portion 32 may be connected to the housing unit 11 in a movable state so as to be interlocked with the operation of the lid body 12.

The second bearing end portion 33 is an end portion disposed on the distal end-side, that is, the forward side, of the bearing unit 22.

The reinforcing unit 14 is disposed at a position that prevents deformation of the bearing unit 22 when external force that causes deformation in the widening direction of the U-shaped opening of the bearing unit 22 is applied to the bearing unit 22.

Herein, the external force that causes deformation in the widening direction of the U-shaped opening is force applied toward the forward direction with respect to the lid body 12 in which the opening 11*a* is in the closed state, or downward force applied from above to the lid body 12 being in the opened state. In these cases, force is applied to the bearing unit 22 so as to move the second bearing end portion 33 in the forward direction from the shaft unit 21.

When external force that may move the second bearing end portion 33 in the forward direction is applied to the bearing unit 22, the reinforcing unit 14 prevents deformation of the bearing unit 22 by being disposed in a position that abuts against the second bearing end portion 33.

One example of a specific structure and arrangement of the reinforcing unit 14 will be described.

The reinforcing unit 14 includes a fixed portion fixed to the housing unit 11 and a protruding portion provided to protrude in the forward direction. Herein, the reinforcing unit 14 is described as including a first fixed portion 41 being fixed to the housing unit 11, a second fixed portion 42, and a protruding portion 43 at least a part of which protrudes further than the first fixed portion 41. Note that, it is assumed that the first fixed portion 41, the second fixed portion 42, and the protruding portion 43 are each made of a stopper metal plate, and the shape of each of the portions is formed by processing a single sheet.

Herein, the first fixed portion 41 is a three-surface metal fitting-like metal plate having three surfaces provided perpendicularly to each other, and is formed long in the up-down direction.

More specifically, the first fixed portion 41 is a metal plate having three surfaces, which are a first surface 41*a*, a second surface 41*b*, and a third surface 41*c*. Note that, the first fixed portion 41 is disposed above a part where the first bearing end portion 32 of the bearing unit 22 is connected to the edge 11*b*, and is fixed to the edge 11*b*.

For example, the first surface 41*a* is disposed in such a way that the normal direction is the front-rear direction of the housing unit 11, and is disposed so as to be in contact with a front-side surface of the edge 11*b*. Note that, the first surface 41*a* is provided with a hole penetrating in the front-rear direction, and is fixed to the edge 11*b* by screwing through the hole.

For example, the second surface 41*b* is disposed in such a way that the normal direction is the left-right direction of the housing unit 11, and is fixed to a surface having a normal line in the inner side and in the left-right direction of the housing unit 11. For example, the second surface 41*b* may be fixed to the housing unit 11 by screwing in a similar manner as the first surface 41*a*.

The third surface 41*c* is disposed at a lower section of the first fixed portion 41 in such a way that the surface faces the up-down direction. For example, since the first fixed portion 41 is formed to be long in the up-down direction, the third surface 41*c* is formed to have a smaller area than the first surface 41*a* and the second surface 41*b*.

The second fixed portion 42 is a metal plate disposed in such a way as to be partially fixed in the outside direction of the housing unit 11 and extend in the inside direction. For example, an L-shaped metal plate can be used as the second fixed portion 42.

As one example, the second fixed portion 42 has a first surface 42*a* (not illustrated) disposed in such a way that the normal direction is the left-right direction of the housing unit 11 and fixed to the housing unit 11, and a second surface 42*b* disposed in such way that the surface faces the up-down direction. In other words, the first surface 42*a* and the second surface 42*b* have a shape in which the surfaces are vertically arranged.

Herein, the second fixed portion 42 is slightly lower than the third surface 41*c* of the first fixed portion 41 and is disposed in front of the third surface 41*c*.

The protruding portion 43 is provided in such a way that at least a part thereof protrudes in the forward direction in the vicinity of the third surface 41*c* of the first fixed portion 41.

Herein, the protruding portion 43 includes an extending portion 43*a* configured to extend in the front-rear direction, and a bent portion 43*b* that is a distal end of the extending portion 43*a* and configured to bend downward from the extending portion 43*a*. Note that, in the protruding portion 43, a portion on the distal end-side of the bent portion 43*b* is referred to as a distal end portion 43*c*.

It is assumed that the protruding portion 43 is made of a metal plate different from that of the first fixed portion 41 and the second fixed portion 42. The protruding portion 43 is reinforced by being connected, through welding, to a metal plate forming the first fixed portion 41 and the second fixed portion 42.

For example, as illustrated in FIG. 2, the upper surface of the extending portion 43*a* extending in the front-rear direction of the protruding portion 43 is connected to the lower surface of the third surface 41*c* of the first fixed portion 41 through welding. Further, the lower surface of the extending portion 43*a* is connected to the upper surface of the second fixed portion 42 through welding, further in the forward-side than the welded part between the upper surface of the extending portion 43*a* and the lower surface of the third surface 41*c*.

Further, the bent portion 43*b* is disposed further in the forward-side than a part of the protruding portion 43 being fixed to the upper surface of the second fixed portion 42. As a result, the distal end portion 43*c* of the protruding portion 43 is disposed in such a way that the surface faces the front-rear direction.

Herein, the rear surface of the distal end portion 43*c* is disposed in such a way that the second bearing end portion 33 abuts the rear surface of the distal end portion 43*c* when the lid body 12 is in the opened state and external force is applied to the bearing unit 22.

As a result, when external force that causes deformation in a widening direction of the U-shaped opening is applied to the bearing unit 22, the rear surface of the distal end portion 43*c* of the protruding portion 43 comes into contact with the second bearing end portion 33, and thereby prevents the second bearing end portion 33 from being deformed in the forward direction.

Therefore, deformation of the bearing unit 22 can be prevented by fixing a part of the reinforcing unit 14 to the housing unit 11 of the electronic device 1 and disposing another part of the reinforcing unit 14 in a direction in which the bearing unit 22 deforms due to external force.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

For example, the first fixed portion 41 and the housing unit 11 have been described as being fixed by screwing, but a screw for fixing the housing can be used in co-tightening.

Further, for example, the first fixed portion 41 of the reinforcing unit 14 has been assumed to have a shape having three surfaces, and the second fixed portion 42 has been assumed to have an L-shape, but the present invention is not limited thereto. In the reinforcing unit 14, the protruding portion 43 needs to be fixed to the housing unit 11. Typically, as described above, a part extending in a plate shape of the protruding portion 43 may be fixed by being sandwiched from above and below and welded, but the method of fixing is not limited thereto.

Further, as illustrated in FIG. 2, the protruding portion 43 may have a shape that extends to the inner side of the housing unit 11 and includes a bent shape. Also, such part of the protruding portion 43 may be fixed by being sandwiched between the first surface 41*a* of the first fixed portion 41 of the reinforcing unit 14 and the housing unit 11.

Further, the rear surface of the distal end portion 43*c* of the protruding portion 43 has been described to be disposed in such a way that the second bearing end portion 33 abuts the rear surface of the distal end portion 43*c* when the lid body 12 is in the opened state and external force is applied to the bearing unit 22, but is not limited thereto. In other words, the distal end portion 43*c* and the second bearing end portion 33 may be abutted against each other regardless of whether the lid body 12 is in the closed state or the opened state, may be abutted against each other only when the lid body is in the opened state, or may be abutted against each other only when the lid body is in the opened state and external force is being applied.

This application is based upon and claims the benefit of priority from Japanese Patent Application No. 2020-200167, filed on Dec. 2, 2020, the disclosure of which is incorporated herein in its entirety by reference.

REFERENCE SIGNS LIST

1 ELECTRONIC EQUIPMENT (KITCHEN PRINTER)
11 HOUSING UNIT
11*a* OPENING
11*b* EDGE
11*c* EDGE
12 LID BODY
13 HINGE UNIT
13*a* FIRST HINGE UNIT
13*b* SECOND HINGE UNIT
14 REINFORCING UNIT
21 SHAFT UNIT
22 BEARING UNIT
31 BEARING MAIN BODY PORTION
32 FIRST BEARING END PORTION
33 SECOND BEARING END PORTION
41 FIRST FIXED PORTION
41*a* FIRST SURFACE
41*b* SECOND SURFACE
41*c* THIRD SURFACE
42 SECOND FIXED PORTION
42*a* FIRST SURFACE
42*b* SECOND SURFACE
43 PROTRUDING PORTION
43*a* EXTENDING PORTION
43*b* BENT PORTION
43*c* DISTAL END PORTION

The invention claimed is:

1. An electronic device comprising:
a housing unit;
a hinge unit; and
a lid body configured to be provided on the housing unit in an openable and closable manner via the hinge unit,
wherein the hinge unit includes:
a shaft unit configured to serve as a rotating shaft when the lid body is opened/closed with respect to the housing unit;
a bearing unit configured to have a U-shaped opening to which the shaft unit is fitted in a detachable manner; and
a reinforcing unit configured to abut, when external force that causes deformation in a widening direction of the U-shaped opening of the bearing unit is applied to the bearing unit, against the bearing unit to which moving force is applied by the external force, and
wherein the bearing unit includes:
a bearing main body portion configured to have the U-shaped opening; and
a first bearing end portion and a second bearing end portion configured to be provided with the bearing main body portion interposed therebetween,
the first bearing end portion is connected to the housing unit, and
the second bearing end portion abuts against the reinforcing unit, at least a part of which is disposed in a moving direction in which the second bearing end portion moves by the external force being applied.

2. The electronic device according to claim 1, wherein the reinforcing unit includes:

a fixed portion configured to be fixed to the housing unit; and a protruding portion configured to be connected to the fixed portion and have an extending portion extending in a direction away from the housing unit, and a distal end of the protruding portion abuts against the second bearing end portion.

3. The electronic device according to claim 2, wherein the reinforcing unit is disposed above the bearing unit, and the reinforcing unit further has a bent portion partially bent downward from the extending portion of the protruding portion, and abuts against the second bearing end portion of the bearing unit at a distal end-side of the bent portion.

4. The electronic device according to claim 2, wherein the fixed portion includes:

a first fixed portion configured to be connected to an upper surface of the extending portion; and a second fixed portion configured to be connected to a lower surface of the extending portion.

5. The electronic device according to claim 2, wherein the bearing unit is a bearing metal plate formed through processing of providing a U-shaped opening in a single metal plate, and the protruding portion of the reinforcing portion is a stopper metal plate formed through processing of bending a single metal plate.

* * * * *